Figure 1:
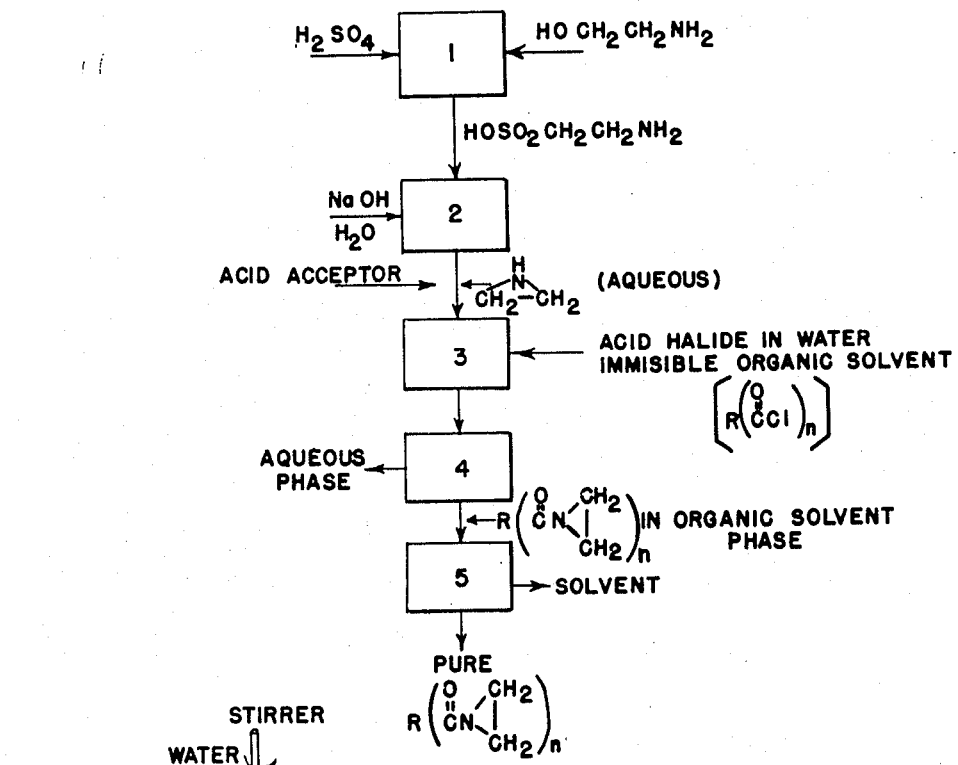

INVENTOR.
GEORGE H. SMITH

United States Patent Office 3,115,490
Patented Dec. 24, 1963

3,115,490
PROCESS FOR PREPARING 1,2-ALKYLENAMIDES
George H. Smith, Maplewood, Minn., assignor to Minnesota Mining and Manufacturing Company, St. Paul, Minn., a corporation of Delaware
Filed Nov. 2, 1959, Ser. No. 850,330
4 Claims. (Cl. 260—239)

This invention relates to a new and useful process for the preparation of acid unstable 1,2-alkylamides by the reaction of a 1,2-alkylene imine and an acid halide in a multiple-phase system.

This application is a continuation-in-part of my prior and copending applications, Serial No. 645,005, filed March 11, 1957 now abandoned; Serial No. 676,400, filed August 5, 1957 now abandoned; Serial No. 832,152, filed August 7, 1959; and Serial No. 840,255, filed September 16, 1959.

It is an object of this invention to prepare new and novel acid unstable 1,2-alkylenamides having a high degree of purity.

It is another object of this invention to teach a method for the preparation of acid unstable 1,2-alkylenamides from an aqueous 1,2-alkylene imine solution.

It is another object of this invention to teach the direct preparation of 1,2-alkylenamide solutions.

Other objects and advantages of this invention will become apparent upon reading the full specification.

The problems encountered in respect to stability and purity of 1,2-alkylenamides are to some extent interrelated. In the process of this invention acid unstable 1,2-alkylenamides have been prepared for the first time in a form whereby they may be isolated as pure compounds. Because of their purity they can be stored over extended periods of time without undergoing any spontaneous reaction or decomposition. Likewise their reactivity can be controlled.

The acid unstable 1,2-alkylenamides prepared in accordance with the teachings of this invention undergo ring opening reactions in an acid medium and their reactivity is such that they cannot be reproduced by reversing the reaction conditions by any known method. It will be appreciated that if these compounds would enter into a reversible reaction the problem of obtaining these compounds in a pure form would be eliminated to a large extent. In view of their highly reactive characteristics and the irreversibility of the reaction mechanism, it is essential that the acid unstable compounds made possible by this invention be isolated directly as pure compounds.

It has been discovered that acid unstable 1,2-alkylenamides may be prepared from a 1,2-alkylene imine water solution and an acid halide by contacting a 1,2-alkylene imine water phase with a solution of an acid halide in a water immiscible organic solvent, reacting the acid halide and the 1,2-alkylene imine to produce a 1,2-alkylenamide and a hydrohalic acid and neutralizing the hydrohalic acid with an acid acceptor contained in water phase. The resulting 1,2-alkylenamides may be separated from the organic solvent by removal of the solvent or by precipitation from the solvent. Likewise, the solution itself may be concentrated or employed directly.

Compounds made possible by this invention are expressed by the formula

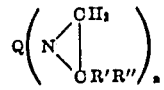

where Q is an $n$ valent radical, N is linked to an atom having a valence of 4 or 5, and R' and R" are hydrogen or an alkyl group. 1,2-alkylenamides which are derivatives of carboxylic acids, carbonic acids and phosphorus acids are the principal acid unstable 1,2-alkylenamides made possible by the process of this invention. Correspondingly, the preferred acid halides which may be employed in the practice of this invention contain one or more of the following functional groups:

and

where X is a halogen (preferably chlorine) and $m$ is 2 or 3. The 1,2-alkylenamides which find the greater utility are polyfunctional such as those prepared from di-acid halides which may be represented by the following structural formulas:

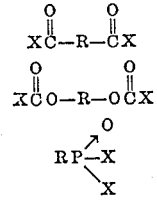

where X is as defined above and R is an organic radical that does not contain an active hydrogen, i.e. hydrogen contained in functional groups such as amino, carboxylic, mercapto and others. Preferably all hydrogens are inactive to the Zerevitinoff test (inert to Grignard reagents). Illustrative organic diacyl halides which may be employed to advantage in this invention are adipoyl chloride, sebacoyl chloride, iso-phthaloyl chloride, terephthaloyl chloride, and hexahydrophthaloyl chloride. Illustrative bishalocarbonates are 1,4-butane diol bis chloro-carbonate and triethylene glycol bis chlorocarbonate. Illustrative penta-valent phosphorus acid halides are phosphorus oxy chloride and other oxy phosphorus halides, such as aryl and alkyl phosphordihalidates, i.e. phenyl and butyl phosphorodichloridate.

These acid halides are reacted with 1,2-alkylene imines of the general formula

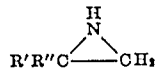

where R' and R" are hydrogen or an alkyl group having not more than 4 carbon atoms.

Various methods for the preparation of these 1,2-alkylene imines are known. Most of these methods result in an aqueous solution of the imine and its isolation from water has been found to be expensive and involved. In this invention the aqueous imine solution may be employed directly in the preparation of the 1,2-alkylenamides.

U.S. Patent No. 2,264,759 describes one process for the preparation of an aqueous imine solution. This process may be illustrated as follows:

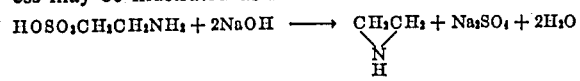

Another suitable method for the preparation of 1,2-alkylene imines may be illustrated structurally as follows:

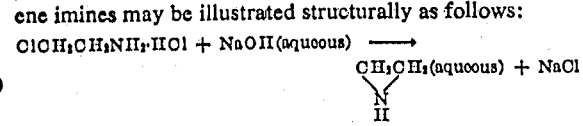

Substituted 1,2-alkylene imines as defined above may also be prepared by these processes.

The acid halide and 1,2-alkylene imine are mixed and contacted under conditions of addition such that the unreacted acid halide reacts preferentially with the 1,2-alkylene imine rather than the already formed 1,2-alkylenamide. Under normal conditions this is accomplished by maintaining the concentration of 1,2-alkylene imine at a molar concentration at least equal to the concentration of acid halide radicals. Preferably, the 1,2-alkylene imine is present in excess which becomes increasingly important as the concentration of the 1,2-alkylenamide increases in the organic phase. In the initial stages of a continuous process or in a batch process it is necessary to add the acid halide to the 1,2-alkylene imine in order to avoid excessive concentrations of acid halide.

Generally speaking, the process conditions of this invention must be such that side reactions are minimized, i.e. the 1,2-alkylenamide formed is not hydrolyzed and does not react with the liberated hydrohalic acid or other reactive compounds. This is accomplished by carrying out the reaction in a multi-phase system which is maintained at about or below room temperature. The reaction temperature and the amount of cooling will vary somewhat with the various reactants, especially the acid halide. In general, temperatures in the range of −5 to 20° C. are employed. The reaction time will vary to a large extent with the reaction temperature and may vary from about 10 minutes to 6 hours.

Various agitation techniques for maximizing the intimate contact between the aqueous phase and the water immiscible organic solvent phase can be employed, i.e. stirring, flow turbulence and other mechanical dispersion techniques can be used to advantage.

It may also be desirable to further minimize side reactions by having 1,2-alkylene imine droplets present, especially in the preparation of the water soluble 1,2-alkylenamides. This result may be accomplished by adding an electrolyte to "salt out" the 1,2-alkylene imine. In this manner the aqueous phase is saturated at all times with 1,2-alkylene imine.

Most any water immiscible organic solvent may be used as the solvent for the acid halide and the resulting 1,2-alkylenamide. It must of course be non-reactive to the acid halide and the 1,2-alkylenamide under the conditions of the reaction. Aromatic hydrocarbon solvents are the preferred solvents, such as benzene, toluene, and xylene. Other suitable solvents are ethers, such as diethyl ether, ketones, such as methyl isobutyl ketone, and chlorinated organic solvents, such as chloroform and trichloroethylene.

The acid acceptor to be added to the aqueous phase is a basic compound and may also be employed to control the alkalinity of the aqueous phase. Illustrative basic compounds which may be employed are sodium carbonate, sodium bicarbonate, potassium carbonate, ammonium carbonate, potassium bicarbonate, sodium and potassium hydroxide and mixtures of two or more basic compounds.

Figure 2:
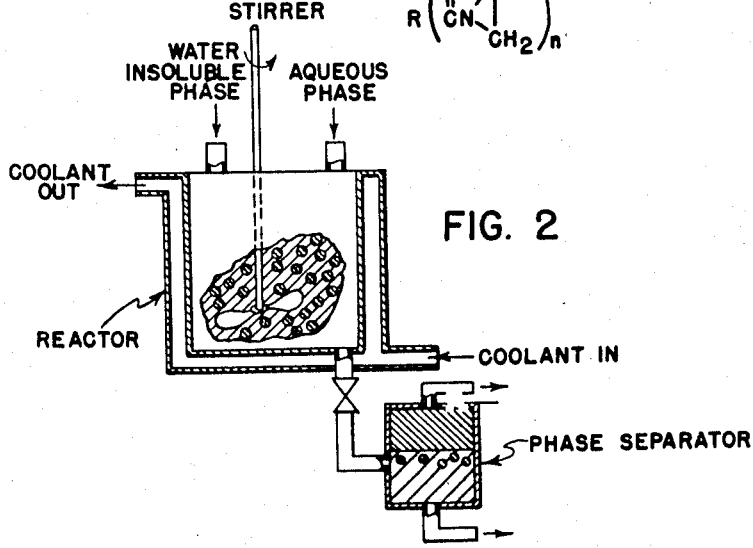

In the drawing, FIGURE 1 is a step-wise representation of the above-defined process employing ethylene imine and an acid chloride of a carboxylic acid as the reactants to prepare pure 1,2-alkylenamides;

FIGURE 2 represents a diagrammatic sketch of a preferred method for preparing the acid unstable 1,2-alkylenamide in a continuous or batchwise operation.

This invention may be illustrated further by reference to the following examples in which all "parts" are expressed as parts by weight and all "percentages" are expressed as percent by weight, unless otherwise specified.

EXAMPLE 1

To a 2000 ml. three-neck reaction flask equipped with a stirrer, a thermometer, a condenser and dropping funnel were added 110 grams of potassium carbonate, 800 grams of water and 43 grams of ethylenimine. The mixture was stirred until a solution was obtained which was then cooled to about 15° C. To the resulting solution was added dropwise with cooling and vigorous stirring a solution of about 95.6 grams of isosebacoyl dichloride prepared from "isosebacic acid" (a product of the U.S. Industrial Chemical Company consisting of 72–80% of 2-ethylsuberic acid, 12–18% of 2,4-diethyladipic acid and 6–10% of n-sebacic acid) dissolved in 400 ml. of diethyl ether. During this time the temperature of the mixture was maintained below 15° C. and the acid chloride added at a rate of approximately one gram per minute. The reaction mixture was allowed to warm gradually to room temperature, while stirring, for an additional hour. During the total reaction period, the pH of the reaction mixture dropped from approximately 12.5 at the beginning of the reaction to about 8.6 at the end. The ether layer was separated, dried over solid anhydrous sodium hydroxide at 0° C. for one hour, the sodium hydroxide removed by filtration and the ether removed from the filtrate under reduced pressure. The resulting reaction product, N,N'-bis-1,2-ethylenisosebacamide, remained as a water-white liquid. The yield was 93 grams or 93 percent of the theoretical. When subjected to analysis the product was found to contain 10.8 percent nitrogen and 33.3 percent azirane radical as compared with the calculated values of 11.1 percent and 33.3 percent, respectively. The chlorine content was less than 1 percent.

EXAMPLE 2

To a 5-gallon, glass-lined, water-jacketed, reaction kettle, equipped with a stirrer, were added the following materials:

| | Pounds |
|---|---|
| Ethylenimine | 1.05 |
| Potassium hydroxide (100% solids present as an inhibitor in the original ethylenimine solution) | 0.53 |
| Potassium bicarbonate (to convert the potassium hydroxide to potassium carbonate) | 0.94 |
| Potassium carbonate | 2.92 |
| Water | 16.5 |

After a solution had formed, a second solution of 2.52 pounds of crude isosebacoyl dichloride (as described in Example 1) dissolved in 9.3 pounds of technical grade benzene was added with stirring over a period of 65 minutes during which time the temperature was maintained at between about 14 and 17° C. The reaction mixture was stirred for an additional two hours during which time the temperature rose to about 25° C. During the reaction period the pH dropped from about 12.5 at the beginning to about 9.7 at the end. The benzene layer was separated, dried over anhydrous calcium sulfate which was removed by filtration and the benzene removed by vacuum distillation. A yield of 2.08 pounds (79 percent of theoretical) of N,N'-bis-1,2-ethylenisosebacamide was obtained. When subjected to analysis, it was found to contain 0.3 percent chlorine and 32.2 percent azirane radical as compared to calculated values of 0 percent and 33.3 percent, respectively.

The room temperature stability of the N,N'-bis-1,2-ethylenisosebacamide produced in accordance with this example was tested by analyzing for the amount of azirane radical remaining after various periods of storage at room temperature (about 21° C.). The results are given below in the following table.

| Length of storage at room temperature: | Azirane radical found, percent of theoretical |
|---|---|
| 2 days | 100 |
| 2 weeks | 100 |
| 1 month | 100 |
| 2 months | 95 |
| 3 months | 76 |

This test of azirane ring breakdown enables one to determine the stability of the monomer. As indicated by the results reported in the table, the monomer of the example is of excellent stability.

EXAMPLE 3

Preparation of N,N'-bis Ethylenadipamide

A 300 ml. three necked flask was equipped with a stirrer, thermometer, condenser, and dropping funnel. To the flask was added 50 ml. of water, 27.6 grams (0.2 mole) $K_2CO_3$, and 9.0 grams (0.21 mole) of ethylenimine. The mixture was stirred and cooled to $-1°$ C. and a solution of 18.3 grams (0.1 mole) of adipoyl chloride in 100 ml. of benzene was added dropwise with stirring. The temperature was kept at 0–5° C. during addition of the adipoyl chloride and while stirring an additional hour. The benzene layer was separated, dried over a desiccant, filtered, and evaporated under vacuum to constant weight. White solid N,N'-bis ethylenadipamide (17.1 grams) which had a melting point of 37–39° C. was obtained, corresponding to 87% yield. Upon analysis the product was found to contain 40.1% azirane ring.

The process of this example is also useful to prepare aralkyl compounds of the structural formula

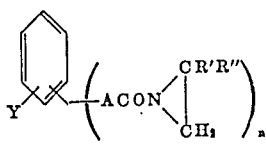

where A is an alkylene radical (preferably containing less than 5 carbon atoms), Y is a halogen (preferably chlorine or bromine), a nitro group, or an alkyl radical, n is an integer (preferably 2 or 3) and R' and R" are as defined above.

N,N'-diethylene p-phenylenediacetamide

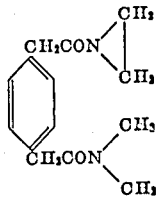

and N,N',N"-tris ethylene-1,3,5-phenylene triacetamide

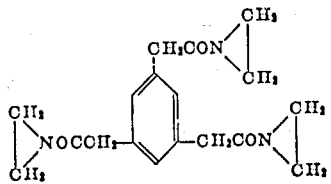

and the corresponding derivatives of 1,2-propylene imine are preferred members of this class of compounds.

EXAMPLE 4

Preparation of N,N'-bis-Ethyleneterephtalamide

A 2000 ml. three necked flask was equipped with a stirrer, thermometer, condenser, and dropping funnel. To the flask was added 600 ml. of water, 55.2 grams (0.4 mole) $K_2CO_3$, and 18.0 grams of ethylenimine. The mixture was stirred and cooled to 10° C. and a solution of 40.6 grams (0.2 mole) of terephthaloyl dichloride in 400 ml. of chloroform was added dropwise with stirring and cooling in 60 minutes. The temperature was kept at 10–12° C. during the addition and then allowed to warm to room temperature while stirring an additional hour. The chloroform layer was separated, dried over a desiccant, filtered, and evaporated to constant weight under vacuum. 42.5 grams of white solid N,N'-bis-ethylenterephthalamide (M.P. 140–143° C.) was obtained, corresponding to a 98 percent yield. Upon analysis the product was found to contain 37.6% azirane ring.

EXAMPLE 5

Stable N,N'-bis-1,2-propylenterephthalamide monomer useful for reacting with the polyene higher fatty acids is prepared as follows: About 400 ml. of water, 41.4 grams (0.3 mole) of potassium carbonate and 23.9 grams (0.42 mole) of 1,2-propylenimine are added with stirring and cooling to a 1000 ml. three-necked flask equipped with a stirrer, thermometer, condenser and dropping funnel. When solution occurs and at a temperature of approximately 12° C., a solution of 40.6 grams of terephthaloyl dichloride in 300 ml. of benzene is added dropwise with vigorous stirring over a period of approximately 45 minutes. The temperature is maintained at approximately 12–15° C. by means of an ice bath. After the benzene solution is added, the ice bath is removed and stirring is continued for an additional hour. The benzene layer is then separated from the aqueous layer and the solvent is removed by distillation under vacuum. A yield of 47.8 grams (98 percent of theoretical) of white crystalline N,N'-bis-1,2-propylenterephthalamide monomer is obtained. The material, which melts at about 96–108° C., is found to contain 11.30 percent of nitrogen and 46.0 percent of 2-methyl-azirane radical as compared to calculated values of 11.48 percent and 45.9 percent respectively.

About 100 parts of "Emery 3055-S" polymerized fatty acid are mixed with 41 parts of N,N'-bis-1,2-propylenterephthalamide and the mixture is heated with agitation until a homogeneous mixture is obtained. The solution is then cured for 30 minutes at 120° C. to form a transparent, flexible, solid resin useful as a protective coating and for encapsulating electrical components.

Examples of other suitable acid halides containing one or more carbocyclic or heterocyclic rings are represented by the formula $$B(COX)_n$$

where B represents an organic ring structure, X is a halogen (preferably chlorine) and n is an integer (preferably 2 or 3). Illustrative ring structures are as follows:

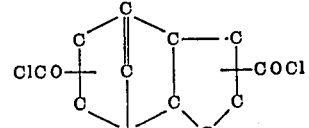

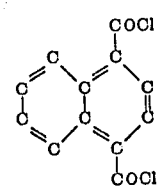

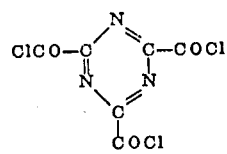

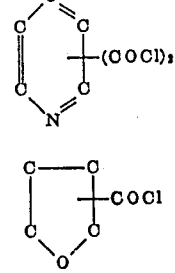

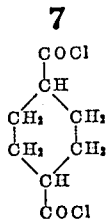

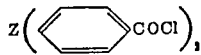

where Z is a divalent radical, such as —O—, —CH₂—, and —SO₂—.

Specific 1,2-alkylenamides prepared from the above acid halides are:

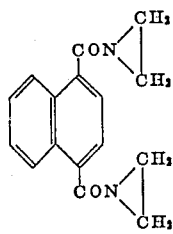

N,N'-bis-ethylene-1,4-naphthalenedicarboxamide

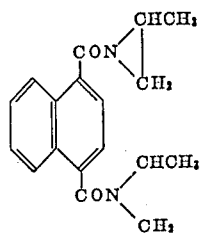

N,N'-bis-1,2-propylene-1,4-naphthalenedicarboxamide

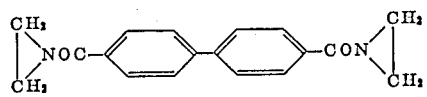

N,N'-bis-ethylene-4,4'-biphenyl-dicarboxamide

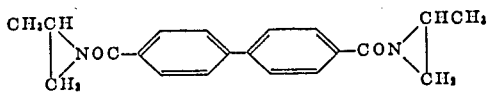

N,N'-bis-1,2-propylene-4,4'-biphenyl-dicarboxamide

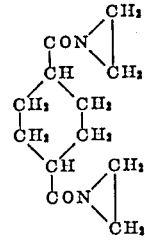

N,N'-bisethylene hexahydroterephthalamide

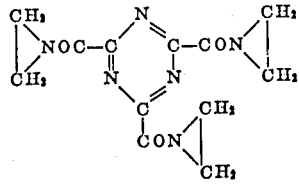

N,N',N''-tris-ethylene triazinetricarboxamide

Likewise acid halides of the general structure

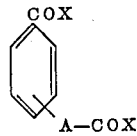

are useful where A and X are as defined above. This class is represented by the compound

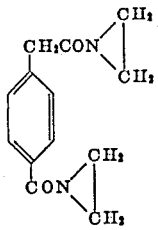

Para-(N-ethylene carboxamidophenyl)-N-ethylene acetamide

EXAMPLE 6

Into a 5-gallon glass-lined reaction kettle equipped with a thermometer, a condenser, and stirrer were added the following materials which were stirred until a clear solution resulted:

|  | Pounds |
|---|---|
| Water | 20.5 |
| Ethylenimine | 1.32 |
| Potassium hydroxide (100% solids) (mixed with the ethylenimine to stabilize it) | 0.8 |
| Potassium bicarbonate (to convert potassium hydroxide to potassium carbonate) | 2.0 |
| Potassium carbonate | 1.07 |

A second solution of about 2.69 pounds of isophthaloyl dichloride dissolved in 19.3 pounds of ethylene trichloride was added to the solution over a 53 minute interval during which time the temperature of the mixture was maintained at from about 13 to 17° C. The mixture was then stirred for about 1¾ hours after the completion of the addition, the temperature being maintained in the same range. The ethylene trichloride fraction was separated, dried over anhydrous calcium sulfate, and the solvent evaporated to produce 2.86 pounds of N,N'-bis-ethyleneisophthalamide as a residue for a yield of 93.9 percent. The reaction product was found to contain 0.8 weight percent chlorine impurity (part of which was inactive chlorine of the residual solvent), and 37.5 weight percent azirane ring content as compared to the calculated values of 0 weight percent and 38.9 weight percent, respectively. The azirane ring content corresponds to 96.5 percent of theoretical. The melting point of the product was about 77° C. and an index of refraction of 1.59 at 80° C.

A sample of the N,N'-bis-ethyleneisophthalamide produced in accordance with this example, after recrystallization from boiling cyclohexane, was aged for six months at room temperature (21° C.) and was found to be substantially unchanged at the end of that time. This was established by redetermining the melting point of the sample, and the percent of azirane ring, both of which were substantially unchanged. This demonstrated that the material was stable, remaining as a substantially pure, unreacted monomer.

EXAMPLE 7

To a 1-liter three-neck flask equipped with a stirrer, thermometer, condenser and dropping funnel, there was charged about 200 ml. of water, 41.4 grams of potassium carbonate and 15.6 grams of 1,2-butylenimine and the mixture stirred until a solution was obtained. A second solution of 20.4 grams of isophthaloyl dichloride dissolved in 100 ml. of chloroform was added over a period of 30 minutes with strong agitation and the agitation continued for 4 hours after the addition was complete. During this time the pH of the mixture dropped from about 12.5 to about 9.7. The temperature was maintained at approximately 14–16° C. throughout the reaction period. The aqueous and organic layers were then separated and the organic layer dried over anhydrous sodium sulfate, the sodium sulfate removed by filtration, and the solvent evaporated to provide 24.8 grams of a water-white viscous liquid product which was identified as N,N'-bis-1,2-butylenisophthalamide, for yield of 89 percent of the theoretical. When the product was subjected to analysis, it was found to contain 0.6 weight percent chlorine impurity (about 0.2 weight percent was inactive chlorine of residual chloroform), and 49.7 weight percent of 2-ethylazirane radical as compared with the calculated values of 0 percent chlorine and 51.5 weight percent of 2-ethylazirane radical. The 2-ethylazirane ring content corresponded to 96.5 percent of the theoretical.

EXAMPLE 8

To a 1000 ml. three-neck reaction vessel equipped with a stirrer, thermometer, condenser and dropping funnel were added 400 ml. of water, 55.2 grams (0.4 mole) of potassium carbonate, and 23.3 grams (0.41 mole) of 1,2-propylenimine. The resulting solution was stirred and cooled to 15° C. at which time a solution of 40.6 grams (0.2 mole) of isophthaloyl dichloride dissolved in 200 ml. of benzene was added dropwise with cooling and stirring over a period of 45 minutes. The temperature was maintained at 14–16° C. during the addition. The reaction mixture was then stirred for an additional six hours during which time the temperature of the mixture was permitted to reach room temperature. The benzene layer was separated and evaporated to give 47.7 grams of N,N'-bis-1,2-propylenisophthalamide, for yield of 98 percent. The product was a water-white liquid, which upon analysis was found to contain 10.9 weight percent nitrogen, 0.37 weight percent chlorine, and 44.9 weight percent 2-methylazirane radical. The calculated values were 11.5 weight percent, 0.0 percent and 46.0 weight percent respectively. This corresponded to 97.5 percent theoretical 2-methylazirane content.

EXAMPLE 9

A 1000 ml. three-necked flask was equipped with a stirrer, thermometer, condenser, and dropping funnel. To the flask was added 500 ml. of water, 82.8 grams (0.6 mole) $K_2CO_3$, and 23.4 grams (0.41 mole) of 1,2-propylenimine. The mixture was stirred and cooled to 10° C. and a solution of 47.5 grams (0.2 mole) of chloroisophthaloyl dichloride in 300 ml. of benzene was added dropwise with stirring and cooling in 60 minutes. The temperature was kept at 10–12° C. during the addition and then allowed to warm to room temperature while stirring an additional hour. The layer was separated, dried over molecular sieve, filtered, and evaporated to constant weight under vacuum. 55.5 grams of solid product, N,N'-bis-1,2-propylenechloroisophthalamide, were obtained, corresponding to 99 percent yield, and melting at 104–112° C. Analysis in percent by weight. Calculated: N◁, 40.2; Cl, 12.75. Found: N◁, 39.5; Cl, 12.90.

This corresponds to an azirane ring constant of 97.5 percent of theoretical and active chlorine impurity content of 0.15 weight percent.

EXAMPLE 10

A 250 ml. three-necked flask was equipped with a stirrer, thermometer, condenser and dropping funnel. To the flask was added a solution of 41.5 grams (0.3 mole) of potassium carbonate in 50 ml. of water, followed by 9.0 grams (0.21 mole) of ethylenimine. This mixture was stirred and cooled to 10° C. A solution composed of 27.5 grams (0.1 mole) of triethylene glycol bis chlorocarbonate in 100 ml. of benzene was then added dropwise to the flask with stirring and cooling over a period of about 18 minutes. The mixture was kept at 10–12° C. during the addition and was allowed to warm to room temperature after the addition had been completed. Stirring was continued for an additional hour. The benzene layer was recovered, dried over a desiccant, filtered and evaporated to constant weight under vacuum. 28 grams of a water-white liquid product, containing 9.74 percent nitrogen and identified as N,N'-bis-1,2-ethylene (triethylene glycol) carbamate, were obtained, corresponding to a 99 percent yield. Its refractive index ($n_D^{25°}$) was 1.4748 and its density ($d_4^{22°}$) was 1.198.

EXAMPLE 11

A 250 ml. three-necked flask was equipped with a stirrer, thermometer, condenser, and dropping funnel. To the flask was added a solution of 41.5 grams (0.3 mole) of potassium carbonate in 50 ml. of water, followed by 9.0 grams (0.21 mole) of ethylenimine. This mixture was stirred and cooled to 10° C. A solution composed of 21.5 grams (0.1 mole) of 1,4-butanediol bis chlorocarbonate in 100 ml. of benzene was then added dropwise to the flask with stirring and cooling over a period of about 22 minutes. The mixture was kept at 10–20° C. during the addition and was allowed to warm to room temperature after the addition had been completed. Stirring was continued for an additional hour. The benzene layer was recovered, dried over molecular sieve (a product of the Linde Air Products Co.), filtered, and evaporated to constant weight under vacuum. 22.2 grams of a clear liquid product containing 11.8 percent nitrogen and 0.7 percent chlorine as compared to calculated values of 12.3 percent and 0.0 percent respectively for pure N,N'-bis-1,2-ethylene(1,4-butanediol)carbamate were obtained which corresponds to a 97 percent yield.

Using the procedure of this invention, various related aromatic containing carbamates and other 1,2-alkylenamides from phenolic compounds are prepared. These compounds are represented by the formula

and

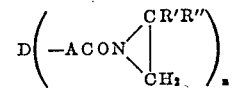

where A, R', R" and n are defined above and D is a phenoxy compound (preferably bis-phenoxy). Illustrative compounds are

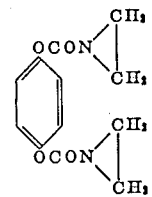

N,N'-bis-1,2-ethylene phenylenoxy carbamates and

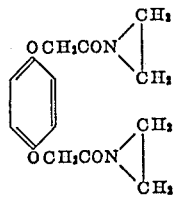

N,N'-bisethylene phenylenoxydiacetamide.

EXAMPLE 12

*Preparation of N,N'-diethylene phenylphosphonic diamide*

A 1000 ml. three-necked flask was equipped with a stirrer, thermometer, condenser, and dropping funnel.

To the flask was added 150 ml. of water, 82.8 grams (0.6 mole) K₂CO₃, and 26.2 grams of ethylenimine. The mixture was stirred and cooled to 10° C. and a solution of 58.5 grams (0.3 mole) of benzene phosphonyl dichloride in 300 ml. of benzene was added dropwise with stirring and cooling in 80 minutes. The temperature was kept at 10–12° C. during the addition of the benzene phosphonyl dichloride and then allowed to warm to room temperature while stirring an additional hour. The benzene layer was separated, dried over a desiccant, filtered, and evaporated to constant weight under vacuum. 59 grams of white solid N,N'-diethylene phenylphosphonic diamide were obtained, corresponding to 95 percent yield. Melting point was 77–79° C. Upon analysis, the product was found to contain 40.3 percent azirane ring and 0.1 percent chlorine.

EXAMPLE 13

*Preparation of Phenyl-N,N'-diethylene-phosphorodiamidate*

A 500 ml. three-necked flask was equipped with a stirrer, thermometer, condenser, and dropping funnel. To the flask was added 70 ml. of water, 41.4 grams (0.3 mole) K₂CO₃, and 13.3 grams (0.31 mole) of ethylenimine. The mixture was stirred and cooled to 10° C. A solution of 31.6 grams (0.15 mole) of phenyl phosphorodichloridate in 130 ml. of benzene was added dropwise with stirring and cooling over a period of 25 minutes. The temperature of the reaction mixture was kept at 10–12° C. during the addition of phenyl phosphorodichloridate and then allowed to warm to room temperature with stirring. The benzene layer was separated, dried over a desiccant, filtered and evaporated to constant weight under vacuum. 32.7 grams of clear liquid phenyl - N,N' - diethylenephosphorodiamidate were obtained, corresponding to 97 percent yield having a refractive index of $n_D^{25}=1.5384$. Upon analysis, the product was found to contain 35.5 percent azirane ring and 0.1 percent chlorine.

EXAMPLE 14

*Preparation of Butyl-N,N'-diethylene-phosphorodiamidate*

A 500 ml. three-necked flask was equipped with a stirrer, thermometer, condenser, and dropping funnel. To the flask was added 60 ml. of water, 41.4 grams (0.3 mole) K₂CO₃, and 13.3 grams (0.31 mole) of ethylenimine. The mixture was stirred and cooled to 10° C. and a solution of 28.6 grams (0.15 mole) of butyl phosphorodichloridate in 100 ml. of benzene was added dropwise with stirring and cooling in 45 minutes. The temperature of the reaction mixture was kept at 10–12° C. during the addition of the butyl phosphorodichloridate and then allowed to warm to room temperature while stirring an additional hour. The benzene layer was separated, dried over a desiccant, filtered, and evaporated to constant weight under vacuum. 28.4 grams of liquid butyl - N,N'-diethylenephosphorodiamidate were obtained, corresponding to a 93 percent yield having a refractive index of $n_D^{25}=1.4652$. Upon analysis the product was found to contain 40.9 percent azirane ring and 0.2 percent chlorine.

EXAMPLE 15

*Preparation of N,N'-diethylene-(N''-methylanilido) phosphoramide*

A 300 ml. three-necked flask was equipped with a stirrer, thermometer, condenser, and dropping funnel. To the flask was added 50 ml. of water, 27.6 grams (0.2 mole) K₂CO₃, and 9.0 grams of ethylenimine. The mixture was stirred and cooled to 10° C. and a solution of 22.4 grams (0.1 mole) of N-methylanilidophosphonyl dichloride in 125 ml. of benzene was added dropwise with stirring and cooling in 25 minutes. The temperature was kept at 10–12° C. during the addition of the N-methylanilidophosphonyl dichloride and then allowed to warm to room temperature while stirring an additional hour. The benzene layer was separated, dried over a desiccant, filtered, and evaporated to constant weight under vacuum. 21.0 grams of white solid N,N'-diethylene-(N''-methylanilido)phosphoramide were obtained, corresponding to 89 percent yield which upon crystallization from heptane melted at 77–79° C. Upon analysis the product was found to contain 35.5% azirane ring and 0.2% chlorine.

Other compounds prepared from the phosphorous acid halides are represented by the formulae

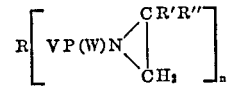

and

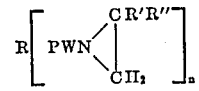

where R, R', R'' and $n$ are as defined above. V is oxygen or nitrogen and W is sulfur or oxygen. Preferably, $n$ is 2, R is a phenyl radical, i.e.

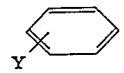

where Y is as defined above or an alkyl radical containing less than 20 carbon atoms and W is oxygen.

Illustrative of this class of compounds are

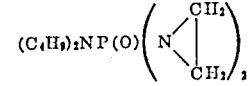

N,N-dibutyl, N,N'-diethylene phosphoramide

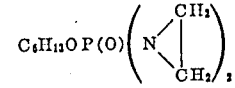

O-hexyl N,N'-diethylene phosphorodiamidate

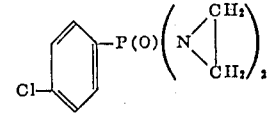

Para-chlorophenyl N,N'-diethylene phosphonamide

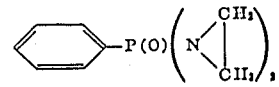

Phenyl N,N'-di-1,2-propylene phosphonamide

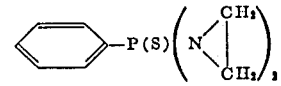

Phenyl N,N'-diethylene thiophosphonic diamide

EXAMPLE 16

A 1000 ml. three-necked flask was equipped with a stirrer, thermometer, condenser, and dropping funnel. To the flask was added 300 ml. of water, 62 grams (.45 mole) K₂CO₃, and 16.4 grams of ethylenimine. The mixture was stirred and cooled to 0° C. and a solution of 39 grams (.166 mole) of resorcinol bis chlorocarbonate in 150 ml. of chloroform was added dropwise with stirring and cooling in 41 minutes. The temperature was kept at 0–5° C. during the addition and then allowed to warm to room temperature while stirring an additional 2 hours. The coloroform layer was separated, dried over a desiccant, filtered, and evaporated to constant weight under vacuum. 37 grams of an amber liquid product were obtained, corresponding to a 90 percent yield of the 1,2-alkylenamide, N,N'-bis-ethylene resorcinol carbamate.

A hard, transparent, glossy resin was prepared by heating the monomer for one-half hour at 120° C.

The preparation of highly pure acid unstable 1,2-alkylenamides is made possible by this invention as exemplified by the above examples. These compounds react readily with acids such as the hydrohalic acids produced during their preparation which must be neutralized as they are formed by an acid acceptor contained in the water phase. The acid unstable 1,2-alkylenamides also react with acid halides which further illustrates the special problems involved in their preparation. Acid stable 1,2-alkylenamides are exemplified by the 1,2-alkylenesulfonamides which may in fact be stabilized by acids and are highly reactive in the presence of bases in contradistinction to the acid unstable compounds made possible by this invention which are stable in the presence of weak inorganic basic compounds. This fundamental difference may also be illustrated by reference to the fact that 1,2-ethylene sulfonamides may be prepared as follows:

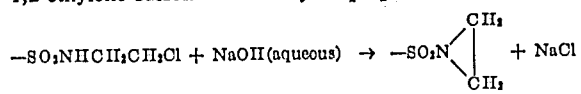

whereas the corresponding acid unstable compounds cannot be prepared by ring closure, but must be prepared directly from the 1,2-alkylene imines.

The products prepared by the process of this invention may be homopolymerized or copolymerized by merely heating them to an elevated temperature, usually not higher than about 150° C. The rate of polymerization may be enhanced by employing an acid catalyst or an active hydrogen containing initiator. Either weak or strong acids may be used. Among the acids are the metal chlorides, such as zinc, aluminum, iron or lead chlorides, the mineral acids, such as hydrochloric, sulfuric or phosphoric acids, sulfonic acids, such as p-toluenesulfonic acid, and other acids, such as boron trifluoride addition complexes. Among the active hydrogen compounds are the hydrazides, such as isophthaloyl dihydrazide, and amines, such as ethylene diamine or monoethanolamine. Copolymers may be produced by heating the polyalkylenamide in accordance with this invention with other reactive monomers having at least two active hydrogen atoms, such as the epoxy monomers, amines, such as the primary monoamines and primary and secondary diamines and triamines, polycarboxylic acids, polymercaptans, polyalcohols, such as castor oils, sugars, glycols, and triols, phenols, and other monomers having a plurality of reactive functional groups. Examples of particularly useful comonomers are aniline, meta-xlylene diamine, piperizine, triethylene tetramine, tetraethylene glycol, dimerized and trimerized fatty acids, hexamethylene dimercaptan, and hydroquinone.

The 1,2-alkylenamides prepared by this invention may also be copolymerized or cross-linked with other polymers or synthetic resins which contain at least two active hydrogens or groups in reactive form, such as urea-formaldehyde polymers, phenolic resins, polysulfide polymers, polyamide polymers, epoxy resins, and polyester polymers containing free carboxyl groups or hydroxy groups. The copolymerization reaction may also serve as a mechanism for chain extension. Substituted 1,2-alkylenamides are less reactive than the 1,2-ethylenamides.

I claim:
1. The process for preparing acid unstable 1,2-alkylene carboxamides which comprises reacting an aqueous solution of 1,2-alkylene imine of the formula

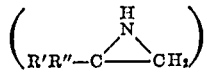

where R' and R" are selected from the group consisting of hydrogen and alkyl of 1 to 4 carbon atoms with a water immiscible organic solvent solution of an acid halide of the formula $R(COCl)_n$, where R is a hydrocarbon radical containing 4 to 12 carbon atoms and $n$ is an integer from 1 to 3, said water immiscible organic solvent selected from the group consisting of hydrocarbons, ethers, ketones, and chlorinated hydrocarbons in the presence of an acid acceptor selected from the group consisting of ammonia and alkali metal carbonates, bicarbonates and hydroxides to form an acid unstable 1,2-alkylene carboxamide of the formula

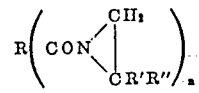

2. The process for preparing acid unstable 1,2-alkylene carboxamides which comprises reacting an aqueous solution of 1,2-alkylene imine of the formula

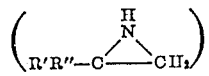

where R' and R" are selected from the group consisting of hydrogen and alkyl of 1 to 4 carbon atoms with a water immiscible organic solvent solution of an acid halide of the formula ClOCRCOCl where R is an alkylene radical containing 4 to 8 carbon atoms, said water immiscible organic solvent selected from the group consisting of hydrocarbons, ethers, ketones and chlorinated hydrocarbons in the presence of an acid acceptor selected from the group consisting of ammonia and alkali metal carbonates, bicarbonates and hydroxides to form an acid unstable 1,2-alkylene carboxamide of the formula

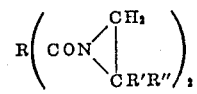

3. The process for preparing acid unstable 1,2-alkylene carboxamides which comprises reacting an aqueous solution of 1,2-alkylene imine of the formula

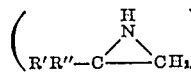

where R' and R" are selected from the group consisting of hydrogen and alkyl of 1 to 4 carbon atoms with a water immiscible organic solvent solution of an acid halide of the formula ClOCRCOCl where R is an arylene radical containing 6 to 12 carbon atoms, said water immiscible organic solvent selected from the group consisting of hydrocarbons, ethers, ketones and chlorinated hydrocarbons in the presence of an acid acceptor selected from the group consisting of ammonia and alkali metal carbonates, bicarbonates and hydroxides to form an acid unstable 1,2-alkylene carboxamide of the formula

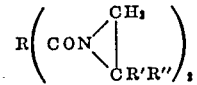

4. The process for preparing acid unstable 1,2-alkylene carboxamides which comprises reacting an aqueous solution of 1,2-alkylene imine of the formula

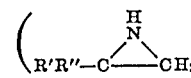

where R' and R" are selected from the group consisting of hydrogen and alkyl of 1 to 4 carbon atoms with a water immiscible organic solvent solution of an acid halide of the formula $R(COCl)_2$, said acid halide selected from the group consisting of adipoyl chloride, sebacoyl chloride, iso-phthaloyl chloride, teraphthaloyl chloride and hexahydrophthaloyl chloride, said water immiscible organic solvent selected from the group consisting of hydrocarbons, ethers, ketones and chlorinated hydrocarbons in the presence of an acid acceptor selected from the group consisting of ammonia and alkali metal carbonates, bicarbonates and hydroxides to form an acid unstable 1,2-alkylene carboxamide of the formula
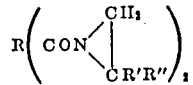
References Cited in the file of this patent
UNITED STATES PATENTS
| | | |
|---|---|---|
| 2,272,489 | Ulrich | Feb. 10, 1942 |
| 2,606,900 | Parker et al. | Aug. 12, 1952 |
| 2,708,617 | Magat et al. | May 17, 1955 |
| 2,802,823 | Tolkmith et al. | Aug. 13, 1957 |
| 2,830,045 | Leumann et al. | Apr. 8, 1958 |
FOREIGN PATENTS
| | | |
|---|---|---|
| 899,955 | France | Sept. 11, 1944 |
| 740,723 | Germany | Oct. 27, 1943 |
OTHER REFERENCES
Bestian: Ann. Chem., volume 566, pages 210–214 (1950).